US007250582B2

(12) United States Patent
Hanson et al.

(10) Patent No.: US 7,250,582 B2
(45) Date of Patent: Jul. 31, 2007

(54) METHOD AND SYSTEM FOR SEQUENTIALLY ORDERING OBJECTS USING A SINGLE PASS DELIVERY POINT PROCESS

(75) Inventors: Bruce H. Hanson, Endicott, NY (US); J. Edward Roth, Lansdale, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 162 days.

(21) Appl. No.: 10/836,192

(22) Filed: May 3, 2004

(65) Prior Publication Data

US 2004/0211710 A1 Oct. 28, 2004

Related U.S. Application Data

(63) Continuation-in-part of application No. 10/265,570, filed on Oct. 8, 2002, now Pat. No. 6,924,451.

(51) Int. Cl.
*B65G 47/30* (2006.01)

(52) U.S. Cl. ...................................... 209/584; 209/900

(58) Field of Classification Search ................ 209/583, 209/584, 698, 900, 912; 198/347.3, 704, 198/867.15

See application file for complete search history.

(56) References Cited

U.S. PATENT DOCUMENTS

| | | | |
|---|---|---|---|
| 1,626,492 | A | 4/1927 | Youngson |
| 2,695,699 | A | 11/1954 | Stille et al. |
| 3,184,061 | A | 5/1965 | Levy |
| 3,598,303 | A | 8/1971 | Folz |
| 3,880,298 | A | 4/1975 | Habegger et al. |
| 3,929,076 | A | 12/1975 | McRae, Jr. et al. |
| 3,941,372 | A | 3/1976 | Matsuo |
| 4,008,813 | A | 2/1977 | Leersnijder |
| 4,247,008 | A | 1/1981 | Dobbs |
| 4,401,301 | A | 8/1983 | Hayskar |
| 4,440,492 | A | 4/1984 | Howard |
| 4,507,739 | A | 3/1985 | Haruki et al. |
| 4,511,024 | A | 4/1985 | Long |
| 4,566,595 | A | 1/1986 | Fustier |
| 4,630,216 | A | 12/1986 | Tyler et al. |
| 4,641,753 | A | 2/1987 | Tamada |
| 4,672,553 | A | 6/1987 | Goldberg |
| 4,690,751 | A | 9/1987 | Umiker |
| 4,974,721 | A | 12/1990 | Born |
| 5,009,321 | A | 4/1991 | Keough |
| 5,016,753 | A | 5/1991 | Henderson |

(Continued)

FOREIGN PATENT DOCUMENTS

| | | |
|---|---|---|
| CA | 2060774 | 8/1992 |
| EP | 0575109 | 12/1993 |
| WO | 9824564 | 6/1998 |

*Primary Examiner*—Joseph C. Rodriguez
(74) *Attorney, Agent, or Firm*—Greenblum & Bernstein, P.L.C.

(57) ABSTRACT

A method and system using a single pass sequencer having a transport system for transporting the mail pieces to a transport system having a moveable carriage system and a stationary carriage system with a plurality of holders slidable between the moveable carriage system and the stationary carriage system. The plurality of holders hold a mail piece of the mail pieces received from the transport system. The mail pieces are sequenced as they are transported or moved from the stationary carriage to the moveable carriage.

8 Claims, 7 Drawing Sheets

U.S. PATENT DOCUMENTS

| | | | | |
|---|---|---|---|---|
| 5,031,223 | A | 7/1991 | Rosenbaum et al. | |
| 5,072,822 | A | 12/1991 | Smith | |
| 5,074,539 | A | 12/1991 | Wells et al. | |
| 5,101,981 | A | 4/1992 | Carbone et al. | |
| 5,119,954 | A | 6/1992 | Svyatsky et al. | |
| 5,133,543 | A | 7/1992 | Eitel et al. | |
| 5,226,547 | A | 7/1993 | Malatesta | |
| 5,289,983 | A | 3/1994 | Ueda et al. | |
| 5,293,983 | A | 3/1994 | Grapes et al. | |
| 5,353,912 | A | 10/1994 | Killer et al. | |
| 5,353,915 | A | 10/1994 | Schneider | |
| 5,363,971 | A | 11/1994 | Weeks et al. | |
| 5,398,922 | A | 3/1995 | Malatesta | |
| 5,446,667 | A | 8/1995 | Oh et al. | |
| 5,558,201 | A * | 9/1996 | Oppliger et al. | 198/476.1 |
| 5,628,162 | A | 5/1997 | Kreusch et al. | |
| 5,706,928 | A | 1/1998 | Neukam | |
| 5,718,321 | A | 2/1998 | Brugger et al. | |
| 5,772,029 | A | 6/1998 | Boccacci | |
| 5,833,076 | A | 11/1998 | Harres et al. | |
| 6,059,091 | A | 5/2000 | Maier et al. | |
| 6,119,929 | A | 9/2000 | Rose | |
| 6,208,908 | B1 | 3/2001 | Boyd et al. | |
| 6,217,274 | B1 | 4/2001 | Svyatsky et al. | |
| 6,239,397 | B1 | 5/2001 | Rosenbaum et al. | |
| 6,241,099 | B1 | 6/2001 | Hendrickson et al. | |
| 6,270,069 | B1 | 8/2001 | Cera et al. | |
| 6,283,304 | B1 | 9/2001 | Gottlied et al. | |
| 6,316,741 | B1 | 11/2001 | Fitzgibbons et al. | |
| 6,328,302 | B2 | 12/2001 | Hendrickson et al. | |
| 6,364,199 | B1 | 4/2002 | Rose | |
| 6,443,311 | B2 | 9/2002 | Hendrickson et al. | |
| 6,466,828 | B1 | 10/2002 | Lem et al. | |
| 6,501,041 | B1 | 12/2002 | Burns et al. | |
| 6,536,191 | B1 | 3/2003 | Ruggiero | |
| 6,555,776 | B2 | 4/2003 | Roth et al. | |
| 6,561,339 | B1 | 5/2003 | Olson et al. | |
| 6,561,360 | B1 | 5/2003 | Kalm et al. | |
| 6,798,748 | B1 | 7/2003 | Mileaf et al. | |
| 6,946,612 | B2 * | 9/2005 | Morikawa | 209/584 |
| 2002/0079255 | A1 | 6/2002 | Anderson | |
| 2002/0139726 | A1 | 10/2002 | Roth et al. | |
| 2003/0141226 | A1 | 7/2003 | Morikawa | |
| 2003/0155282 | A1 | 8/2003 | Kechel | |

* cited by examiner

METHOD AND SYSTEM FOR SEQUENTIALLY ORDERING OBJECTS USING A SINGLE PASS DELIVERY POINT PROCESS

REFERENCE TO RELATED APPLICATION

This application is a continuation in part application to U.S. application Ser. No. 10/265,570, filed on Oct. 8, 2002 now U.S. Pat. No. 6,924,451, which is now incorporated by reference herein in its entirety.

BACKGROUND OF THE INVENTION

1. Field of the Invention

The invention generally relates to a single pass sequencer and process and, in particular, to a system and method for sequencing mail pieces in a single pass to reduce overhead space and costs as well as minimize mail damage.

2. Background Description

The delivery of mail such as catalogs, products, advertisements and a host of other articles have increased exponentially over the years. These mail pieces are known to be critical to commerce and the underlying economy. It is thus critical to commerce and the underlying economy to provide efficient delivery of such mail in both a cost effective and time efficient manner. This includes, for example, arranging randomly deposited mail pieces into a sequential delivery order for delivery to a destination point. By sorting the mail in a sequential order based on destination point, the delivery of mail and other articles can be provided in an orderly and effective manner.

In current sorting processes, optical character recognition systems may be used to capture delivery destination information. A host of feeders and other complex handling systems are then used to transport the mail to a host of bins or containers for sorting and future delivery. To this end, central processing facilities, i.e., United States Postal Service centers, have employed a high degree of automation using bar code readers and/or character recognition to perform basic sorting of articles to be transported to defined geographic regions or to local offices within those regions. It is also known to manually sort mail pieces, but this process is very labor intensive, time consuming and costly.

As to known automated sorting processes, currently, for example, a two pass algorithm process is used as one method for sorting mail based on delivery destination. In this known process, a multiple pass process of each piece of mail is provided for sorting the mail; that is, the mail pieces, for future delivery, are fed through a feeder twice for sorting purposes. In general, the two pass algorithm method requires a first pass for addresses to be read by an optical character reader and assigned a label or destination code. Once the mail pieces are assigned a label or destination code, they are then fed to bins based on one of the numbers of the destination code. The mail pieces are then fed through the feeder a second time, scanned, and sorted based on the second number of the destination code. It is the use of the second number that completes the basis for sorting the mail pieces based on delivery or destination order.

The two pass algorithm method may present some shortcomings. For example, the mail pieces are fed through the feeder twice, which may increase the damage to the mail pieces. Second, known optical recognition systems typically have a reliability of approximately 70%; however, by having to read the mail pieces twice, the rate is multiplied by itself dramatically reducing the read rate and thus requiring more manual operations. That is, the read rate is decreased and an operator may have to manually read the destination codes and manually sort the mail when the scanner is unable to accurately read the destination code, address or other information associated with the mail pieces two consecutive times. Additionally, bar code labeling and additional sorting steps involves additional processing time and sorting machine overhead as well as additional operator involvement. This all leads to added costs and processing times.

It is also known that by using the two pass algorithm method as well as other processing methods, the containers and bins may not be efficiently utilized, thus wasting valuable space. By way of illustrative example, a first bin may not be entirely filled while other bins may be over-filled. In this scenario, the mail pieces are not uniformly stacked within the bins, wasting valuable space, causing spillage or an array of other processing difficulties.

However, U.S. application Ser. No. 10/265,570 solves these problems and provides many advantages over known systems. For example, in U.S. application Ser. No. 10/265,570, a novel single pass system and method has been devised to sort and sequence mail pieces in a single sorting pass, thus eliminating the need for a two pass algorithm and accompanying system. The system and method of U.S. application Ser. No. 10/265,570 minimizes damage to flats, provides a single drop point, as well as increases the overall efficiency by ensuring that "tubs" or other transport containers are efficiently utilized by evenly filling the tubs to a maximum or near maximum level. But, further advances in such system are still possible such as, for example, still further reductions in component parts and use of flooring space.

SUMMARY OF THE INVENTION

In a first aspect of the invention, a system is provided for sorting objects such as, for example, mail pieces. The system includes a feeding station which feeds non-sequenced objects into a plurality of holders for holding and transporting the non-sequenced objects fed from the feeding station. The holders are transportable between a moveable carriage and a stationary carriage to sort the non-sequenced objects stored in the holders into a sequence.

In another aspect of the invention, a method is provided for sorting objects. The method includes inducting objects into separate holders on a first carriage and transporting the separate holders from the first carriage to a second carriage, in substantially a same order. The method further includes instructing the separate holders to move from the second carriage to a corresponding position on the first carriage, incrementally and in sequence, based on sorting criteria of the objects to thereby sequentially order the objects based on delivery destination. The sequenced objects are then unloaded from each of the separate holders.

In another aspect of the invention, the method includes placing non-sequenced mail pieces in separate holders extending from a moveable carriage and assigning codes to the holders and positions on the moveable carriage based information associated with the non-sequenced mail pieces. The holders are moved to corresponding positions on the stationary carriage. The holders are then moved back to the moveable carriage, in sequence. The mail pieces are unloaded.

DETAILED DESCRIPTION OF EMBODIMENTS OF THE INVENTION

The invention provides a flexible system and method for sequencing objects such as, for example, flats, mail pieces and other products or parts (generally referred to as flats or mail pieces) in a mixed stream process using only a single feed or pass through a feeder system. The system and method of the invention reduces damage to flats by using a single pass, and reduces manufacturing and delivery costs while still maintaining superior sorting and delivery results. For example, in one aspect of the invention, overall length and working components can be considerably reduced conserving valuable user floor space and costs by using a stationary storage carriage. The system configuration is also variable to adapt to facility size, in terms of number of routes and size of routes.

Embodiments of the Single Pass Sorting System

Figure 1:
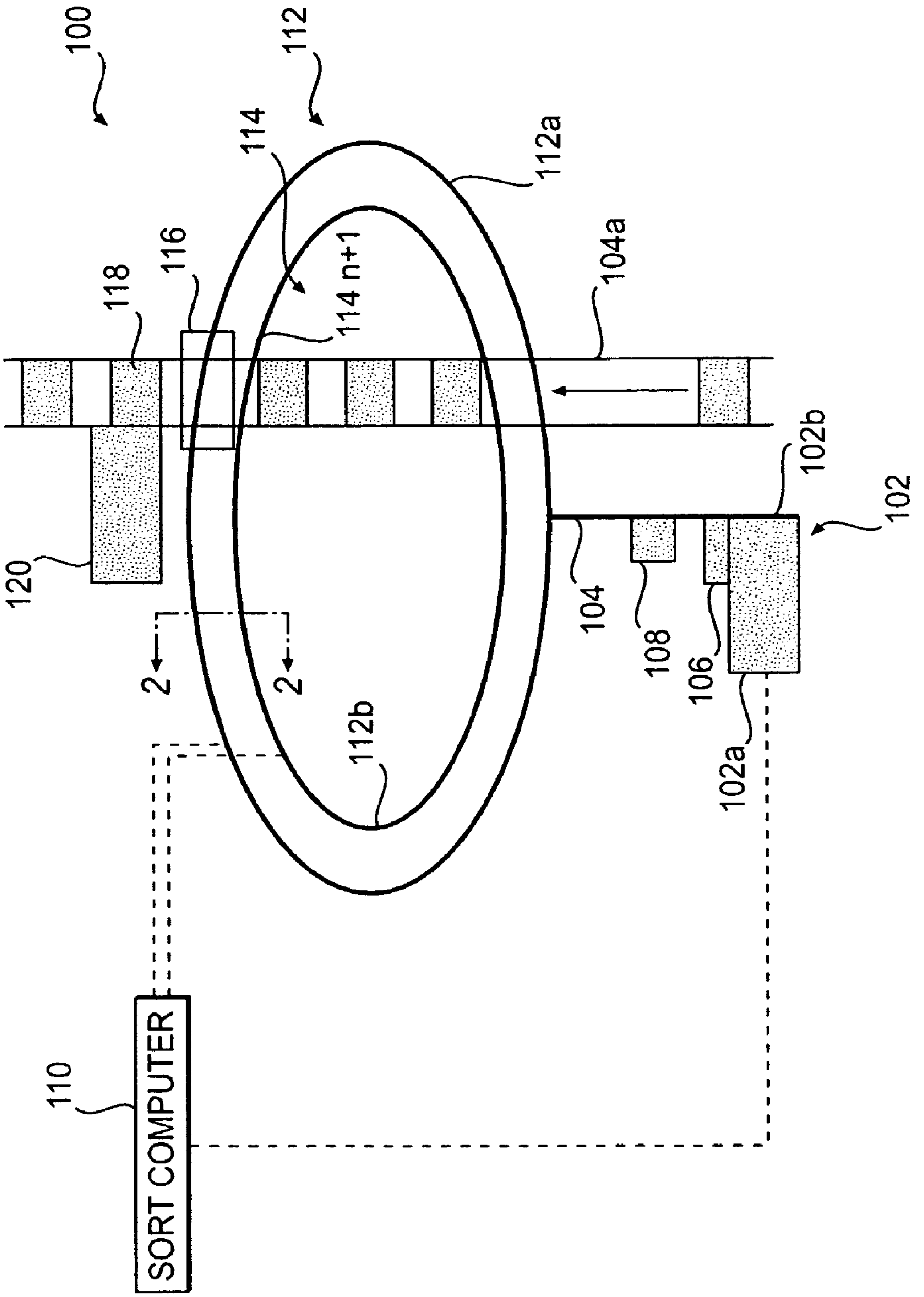
FIG. 1 is an overview of the single pass system utilizing the method of the invention.

FIG. 1 depicts a single pass system that utilizes the method of the invention. The system is generally depicted as reference numeral 100 and includes one or more feeders 102 positioned at a beginning of the process. The feeder(s) 102 may be any known feeder that is capable of transporting flats from a first end 102*a* to a second, remote end 102*b*. In embodiments, the feeder(s) 102 is capable of feeding the stream of flats at a rate of approximately 10,000 per hour. Of course, those of skill in the art should recognize that other feed rates and multiple feeders, depending on the application, might equally be used with the invention.

Still referring to FIG. 1, a transport system or feed track 104 is positioned downstream from the feeder(s) 102, and preferably at an approximate 90° angle therefrom. This angle minimizes the use of valuable flooring space within the processing facility. The feed track 104 may also be at other angles or orientations, depending on the flooring configuration of the processing facility.

A flat thickness device 106 and a scanning device 108 such as, for example, an optical character recognition device (OCR), bar code scanner or the like is provided adjacent or proximate the feed track 104. In embodiments, the flat thickness device 106 measures the thickness of each flat as it passes through the system, and the OCR 108 reads the address or other delivery information which is located on the flat. The flat thickness device 106 may be any known measuring device such as a shaft encoder, for example. The flat thickness device 106 and the OCR 108 communicate with a sorting computer 110 via an Ethernet, Local Area Network, Wide Area Network, Intranet, Internet or the like. The flat thickness device 106 and the OCR 108 provide the thickness and address information to the sort computer 110, at which time the sort computer 110 assigns a virtual code to the flat for delivery and sorting purposes. This is provided via a look-up table or other known method.

In one particular application, for illustration, the OCR 108 will capture information such as, for example, address destination information, from the flats. Once the information is captured, it will be sent to the central processing unit (e.g., sorting computer 110) for interpretation and analysis. Using this information, the sorting computer can provide instructions to any the components of the invention for sequencing the flats, as discussed in more detail below.

FIG. 1 further shows a cell movement mechanism 112 in accordance with the invention, at a remote end 104*a* of the feed transport 104. The cell movement mechanism 112 may be any shape such as an oval shape shown in FIG. 1, or other shapes such as, for example, a loop configuration, e.g., circular, serpentine and the like, in line or other shapes that are designed for certain flooring spaces. In one embodiment, the overall track may be any length, but in one implementation the track may be a diameter of approximately 25 feet. Multiple systems may also be nestable; namely, the system of the invention may be stacked vertically to more efficiently utilize the flooring space of the processing facility.

The cell movement mechanism 112 includes a first, moveable carriage 112*a* and a second, stationary carriage 112*b* (referred hereinafter as the "stationary carriage"). The stationary carriage 112*b* eliminates the need for additional motors and other hardware, otherwise needed to move such a carriage thus reducing overhead costs and flooring space. The first carriage 112*a* may transport the flats in one direction (e.g., when in a loop configuration) or bi-directionally (e.g., when in a line configuration). In one aspect of the invention, a plurality of holders or cartridges 114, $114_{n+1}$ extend downward from the first carriage 112*a* or the stationary carriage 112*b*, depending on the particular stage of the process.

In one implementation, the sort computer 110 tracks each holder in addition to the flats loaded therein, and assigns numerical designations, codes or the like corresponding to the order of the holders 114 on the first carriage 112*a* or the designations associated with the flats placed therein (as discussed below). In this manner, the sort computer 110 is capable of accurately following each flat throughout the system for future sorting.

FIG. 1 further shows an optional packager 116 at a certain predetermined position with respect to the cell movement mechanism 112, and preferably aligned with the first carriage 112*a*. (Those of skill in the art will recognize that multiple packagers can also be used with the invention.) The packager 116 is designed to package the flats as they are unloaded from the first carriage 112*a*, via a releasable bottom portion of the holders 114. The packager 116 then transports the flats to containers 118 that are provided with a label at container labeler 120. In embodiments and due to the tracking of the thickness of each flat, the system of the invention is capable of determining the height of the flats in each container 118 thus ensuring maximum use of each container.

Figure 2:
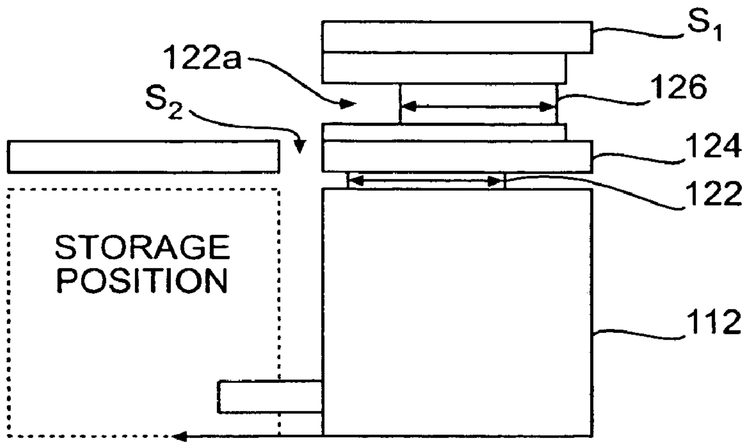
FIG. 2 shows a sectional view of adjacent carriages along line 2—2 of FIG. 1.

FIG. 2 shows a sectional view of the cell movement mechanism along line 2—2 of FIG. 1. In this view, the holder 114 extends downward from the first carriage 112*a*, with a transporting mechanism, allowing the holder 114 to move, e.g., slide or roll, between the first carriage 112*a* and the stationary carriage 112*b*. In one aspect of the invention, the transporting mechanism includes "hangers" 122, suspended from a bar or track 124, which allow the holders to suspend and slide between respective carriages. In one embodiment, the hangers may include wheels or bearings, depicted as reference numeral 122*a*, instead of a "hooked" portion. (The hooked portion, provided about the track, may also be depicted as reference numeral 122*a*.) The wheels or bearings facilitate the movement of the hangers 122 and hence the holders 114 between the tracks of the carriages. Such components of hangers are manufactured by Timken Company of Canton Ohio, for example, and are used by Lockheed Martin Corporation.

The hangers 122 may be transported by sliding between the first carriage and the stationary carriage by known mechanisms such as, for example, linear actuators, solenoids or piston and cylinder assemblies, as depicted at reference numeral 126. The linear actuators, solenoids or piston and cylinder assemblies may be packaged in the cell movement mechanism 112 and communicate with the holders and, in one application, directly with the hangers, themselves. The linear actuators, solenoids or piston and cylinder assemblies push or pull the hangers, depending on the position between the respective carriages. Such linear actuators, solenoids or piston and cylinder assemblies are manufactured by Tol-o-matic Fluid Power Products of Hamel Minn., for example, and are implemented in various applications by Lockheed Martin Corporation. The hangers 122 may also simply be manually moved, although less efficient than an automated means of moving the carriages.

As further shown in FIG. 2, in one aspect of the invention, the spacing $S_1$ between the hangers 122 for each of the holders 114 may be larger than the spacing $S_2$ between the first carriage 112*a* and the stationary carriage 112*b*. This will allow the holders 114 and more specifically the hangers 122 of each of the holders 114 to span the gap between the tracks of the aligned carriages 112*a* and 112*b*, ensuring the stability of the system. Said otherwise, the hangers 122 are designed to allow them to span or bridge the gap or space between the carriages 112*a* and 112*b* thus ensuring that the hangers are always stably "hooked" to one of the carriages 112*a* and 112*b*.

Figure 3:
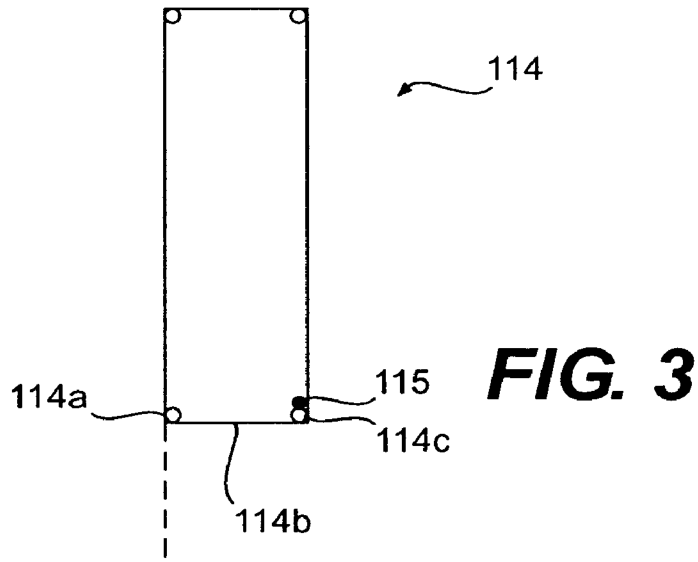
FIG. 3 shows a holder in accordance with the invention.
Figure 4:
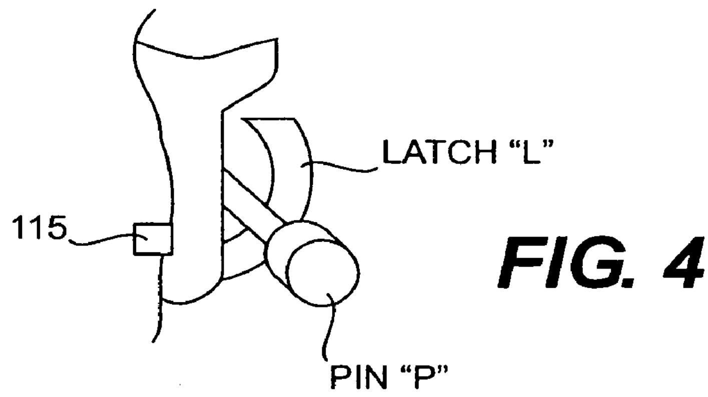
FIG. 4 shows a latch used with the holder.

FIG. 3 shows a holder 114 in accordance with the invention. In one implementation, the holder 114 may have a maximum width of approximately two inches and is a box-shape. The holder 114 includes, in one aspect of the invention, a hinge 114*a* provided on a bottom corner of the holder 114. A drop down or releasable bottom 114*b* may be provided between the hinge 114*a* and a releasable latch 144*c* in order unload the flats from the holder to the packager or the container, for example. To release the bottom 114*b*, an actuator 115 may be actuated which releases the latch 114*c*, for example. The actuator may be a solenoid, or a hydraulic or pneumatic mechanism. The latch may be, for example, a pin "P and latch "L" assembly (FIG. 4). In this type of assembly, the latch "L" is moveable to release the pin "P" in order to drop the bottom portion 114*b*.

Operation of Use

Figure 5A:
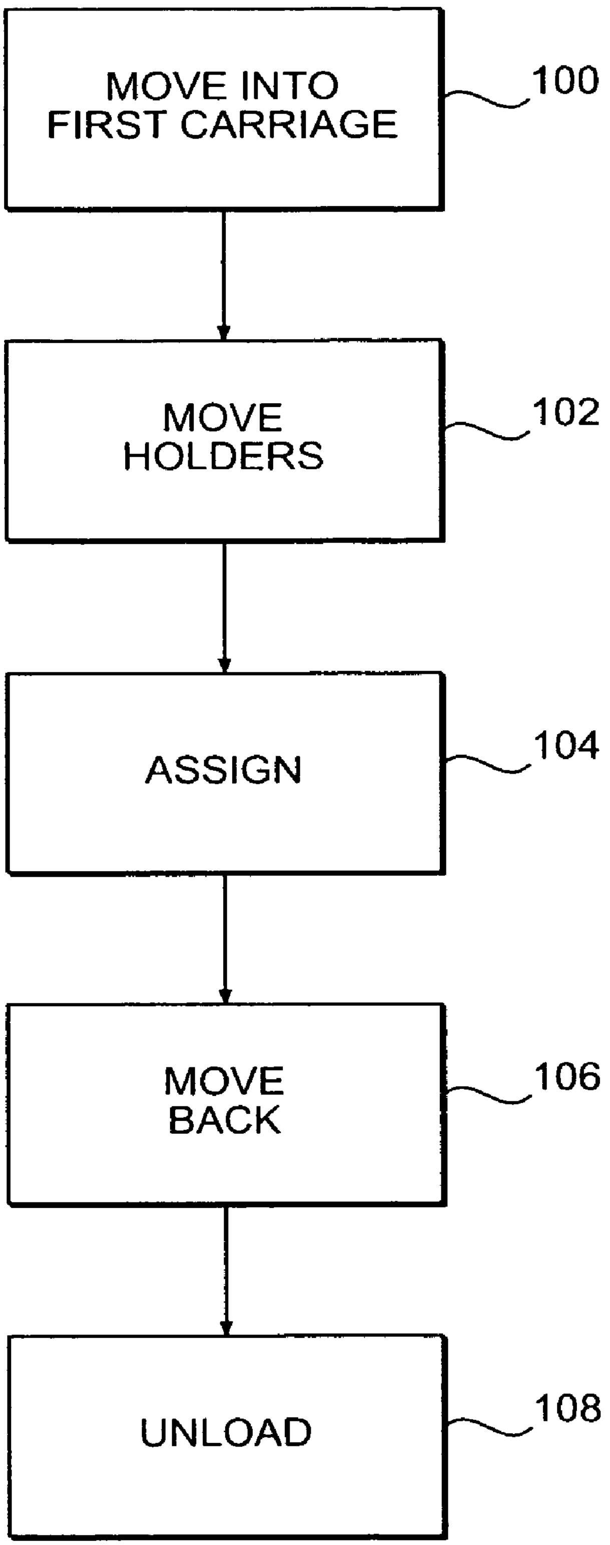
FIGS. 5*a*–5*c* are flow charts implementing the steps of the invention using the system of the invention.
Figure 5B:
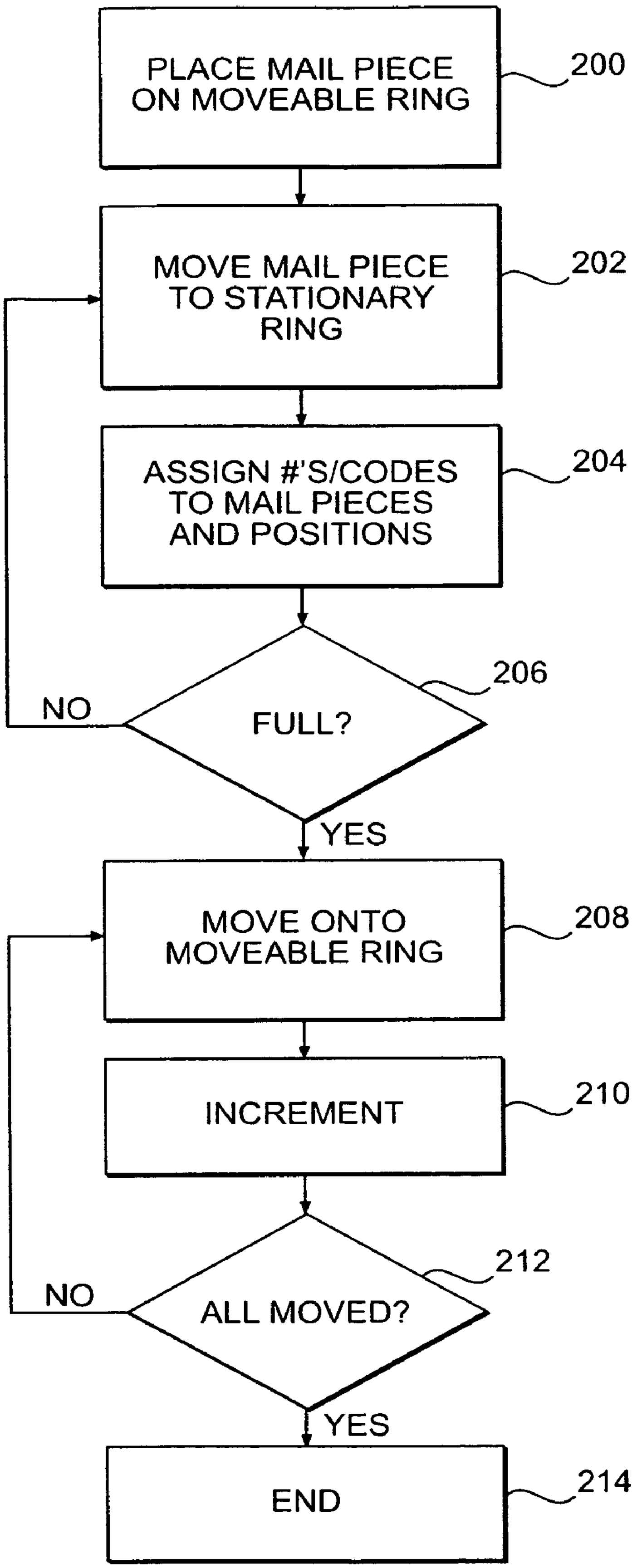
Figure 5C:
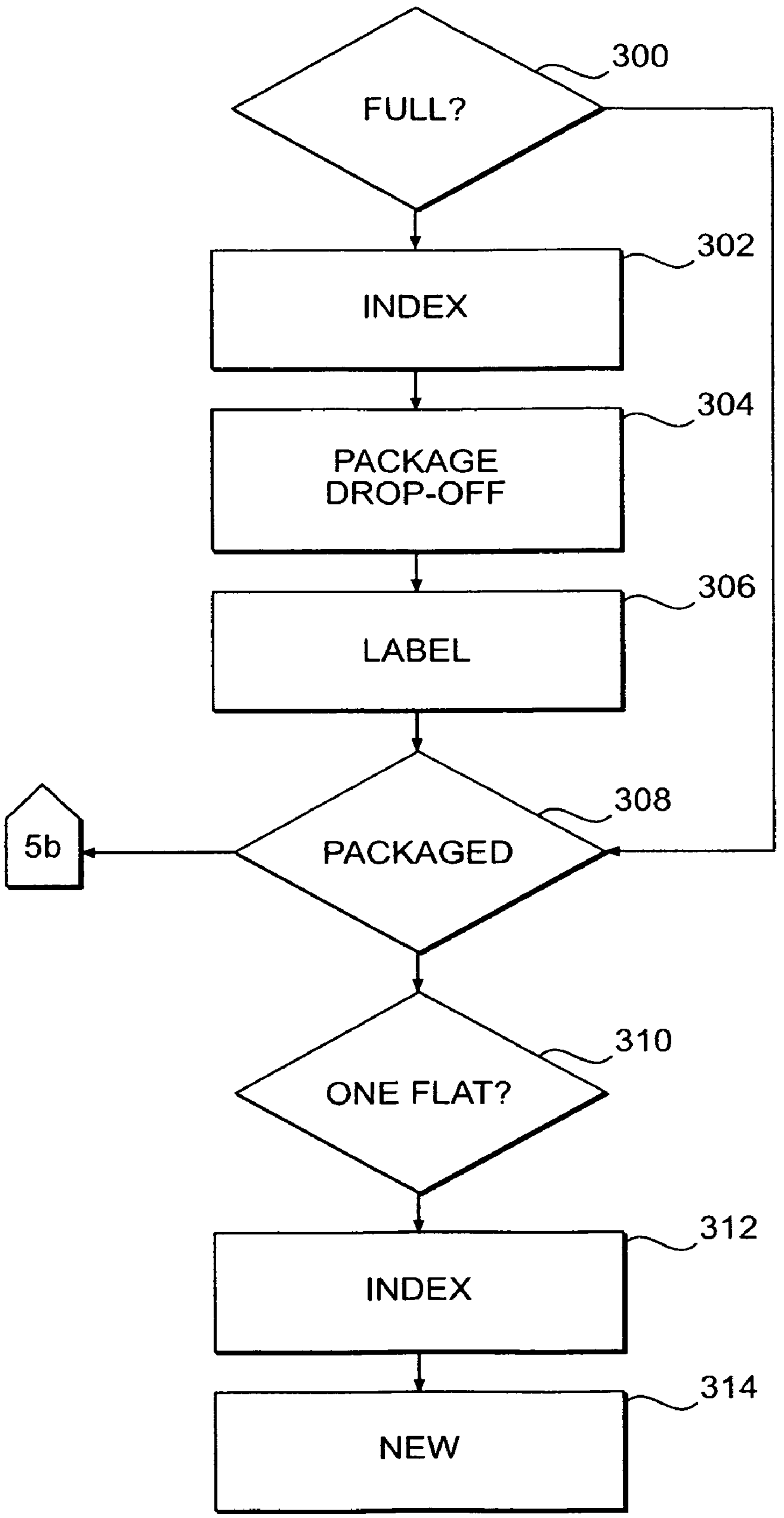

FIGS. 5*a*–5*c* are flow diagrams showing the steps implemented by the invention. The steps of the invention may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation or the sort computer over the Internet or some other type of network. FIGS. 5*a*–5*c* may equally represent a high-level block diagram of the system of the present invention, implementing the steps thereof.

FIG. 5*a* is an embodiment implementing the steps of the invention. In step 100, the non-sequenced flats are placed in the holders extending from the first carriage. In step 102, the first carriage (moveable carriage) incrementally moves and the holders are moved to positions on the stationary carriage. In step 102, the holders are not in sequential order on the stationary carriage. Steps 100 and 102 are repeated until all of the mail pieces for a delivery route or sequence are placed on the stationary carriage. After all of the mail pieces for a delivery route are on the system (transported past the reading device), in step 104, the sort computer assigns codes or the like to the holders and positions on the moveable carriage(s) based on the flat information and sequencing thereof. In step 106, the holders are moved from the stationary carriage to the moveable carriage, in sequence. It should be understood that the ordering of the flats, in sequence, may occur when the holders are moved onto the moveable carriage from the stationary carriage based on the codes assigned to the holders and positions on the respective carriages, as determined by the sort computer. In step 108, the flats are sequentially loaded into the packager or optionally directly into the containers.

Referring now to FIG. 5*b*, in step 200, the flats are inducted into holders on the moveable carriage from the feeders for a delivery route. As the flats are inducted, the image of the flat is captured, which preferably includes the address information for the sort computer computations. In step 202, the flats (holders) are transported to the stationary carriage. The steps 200 and 202 may be performed simultaneously or concurrently. In one embodiment, the holders are moved from the moveable carriage to the stationary carriage, in the order of original induction. This may be performed by (i) loading the flats into the holders on the moveable carriage, (ii) incrementing the moveable carriage until the holder aligns with a next empty space on the stationary carriage, and (iii) moving the holder from the moveable carriage onto the stationary carriage and repeating this process until there are no empty slots or spaces on the stationary carriage or there are no remaining flats.

During this process, or after this process, the sort computer will assign a sort number or code (i.e., sorting criteria) to each of the holders based on the sequence of the flats, as well as the slots on the stationary carriage (in one implementation). That is, a number or code (i.e., a final order sorting information also referred to as a number or code) is assigned to the slots or open spaces on the moveable carriage based on the final order of delivery of the flat. These slots will eventually accommodate the holders, in sequence, as discussed below.

In step 206, a determination is made as to whether all of the slots on the stationary carriage are full or whether there are any remaining flats to be sorted. If there are remaining flats and the slots on the stationary carriage are not full, then steps 202–206 are repeated. If there are no more flats or the slots on the stationary carriage are full, in step 208, the holders on the stationary carriage that are already in a proper alignment with empty slots on the moveable carriage, are then moved to the respective slots (on the moveable carriage). In one aspect of the invention, all of the slots on the stationary carriage are empty to accommodate the holders being moved thereon in delivery order sequence. However, in another aspect of the invention, there may be flats being inducted onto the moveable holder, dynamically, such that these new inductees are being transported to empty slots on the stationary carriage as others are being moved to the moveable carriage.

In step 210, the moveable carriage is incremented until a next empty slot(s) is aligned with the respective holder on the stationary carriage. That is, the moveable carriage is indexed until at least one assigned number or code associated with the slot on the moveable carriage is aligned with an assigned number or code of the holder on the stationary carriage. The indexing is preferably a single, incremental turn of the moveable carriage in either the clockwise or counter clockwise direction. Once this is accomplished, then the holders are moved from the stationary carriage to the moveable carriage, in a sequence. In step 212, a determination is made as to whether all of the holders are moved to the moveable carriage. If not, the process repeats at step 208. If all of the holders are moved, then the process ends at step 214 by releasing the flats from the holders into containers, for example.

In one aspect of the invention and referring to FIG. 5*c*, a determination is made as to whether any of the containers are full, in order to move the container and place an empty container in its place. This might be performed by first measuring the thickness of the flats placed in the delivery container, prior to the placement thereof. By way of example, in step 300, a determination is made as to whether the delivery container is full. If the delivery container is full, then the full delivery container is indexed to a next position in step 302. In step 304, a next delivery container is indexed to the package drop point and, in step 306, the full container is labeled. Of course, these steps do not necessarily have to occur in such order.

If the determination in step 300 is negative or after step 306, a determination is made as to whether all assigned flats for all delivery points are packaged (step 308). If not, then the method can return to the steps of FIG. 5*b*, and more particularly to step 200. If so, then a determination is made as to whether the delivery container has at least one or more flats, in step 310. If yes, then the delivery container is indexed out and labeled (step 312). Then a new container is provided to the first carriage or packager, in step 314, in order to continue the filling process.

EXAMPLE OF USE

Figure 6A:
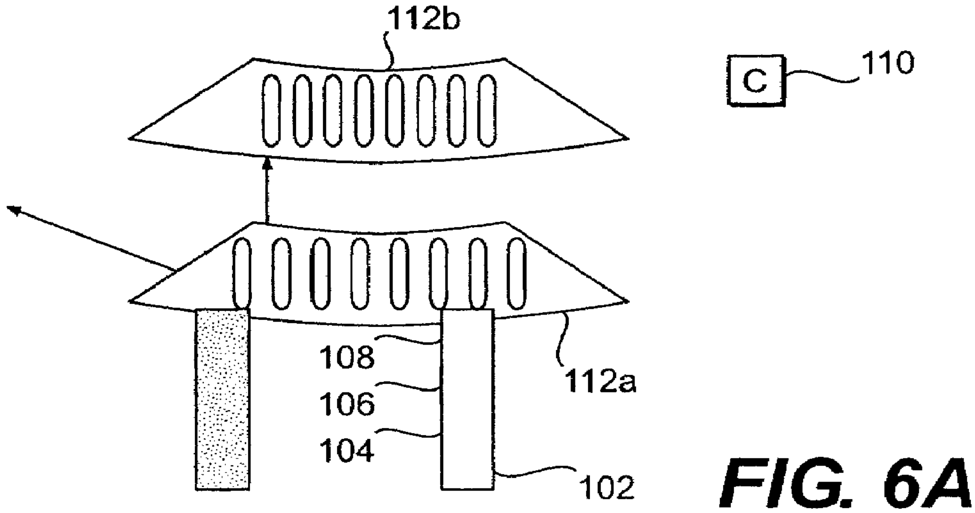
FIGS. 6*a*–6*c* show several operational phases of the system in accordance with the invention.
Figure 6B:
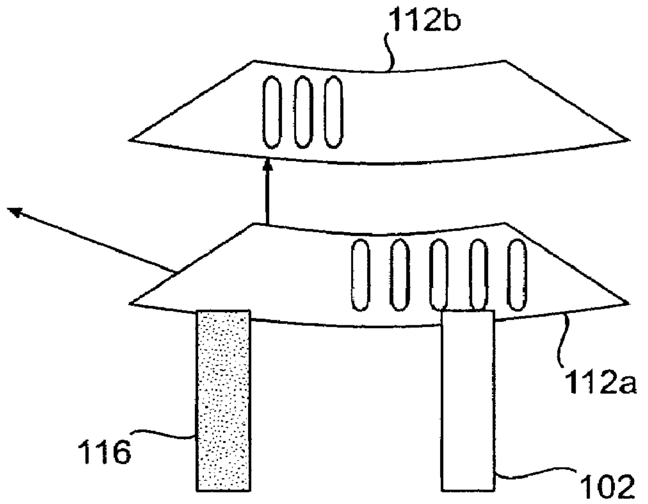
Figure 6C:
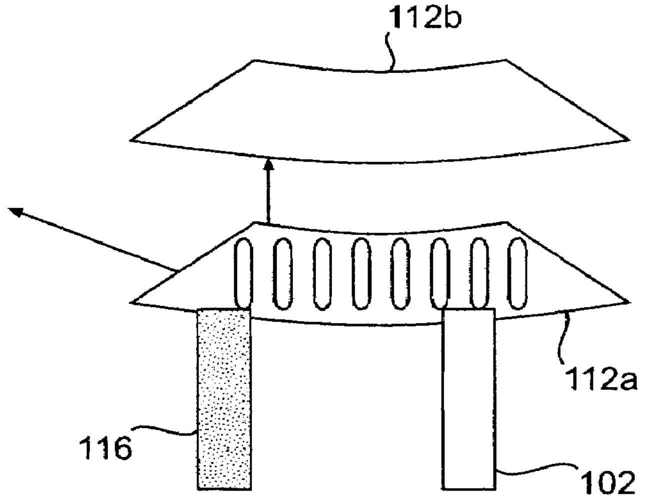

Referring to FIGS. 6*a*–6*c*, an example is illustrated showing the operational stages of the invention. In this example, used for illustrative purposes only and not to limit the scope of the invention, the stream of flats are first fed through the automated feeder 102 at approximately 10,000 per hour. In the feed track or feeder, the flat image is acquired by the OCR 108 and decoded for its destination information (a code is assigned thereto). In addition, mail thickness information is acquired at the flat thickness device 106. The destination and thickness information is stored in the sort computer 110, preferably within a database.

In one implementation, each holder 114, on the first carriage 112*a*, is assigned a sequential number for sorting purposes. The stationary carriage 112*b* is also assigned numbers or codes corresponding to the sequential order of the final completed sort. That is, the order of the holders 114 on the first carriage 112*a* are sequentially assigned a number or code by the sort computer 110; whereas, a number or code is assigned to a position on the stationary carriage 112*b* associated with a delivery destination of each of the flats.

As represented by FIG. 6*a*, the non-sequenced flats are inducted into the holders 114, located on the moving carriage 112*a*, as the holders 114 move serially past each feed station. The first carriage 112*a* is incremented (one by one) so all the holders can be moved from the first carriage 112*a* to the stationary carriage 112*b*. In one implementation, all holders 114 that contain flats will be moved from the first carriage 112*a* to the stationary carriage 112*b* within one complete revolution of the track.

Referring to FIG. 6*b*, following induction of the flats into the holders on the carriage and then into storage, and after address recognition of all flats, the final sequence may be calculated by the sort computer. The first carriage 112*a* may then be restarted and the holders are moved from storage back onto the first carriage 112*a* at the correct times to develop the correct delivery point sequential order; that is, the holders on the stationary carriage 112*b* are moved sequentially to the first carriage for unloading at the optional packager.

In FIG. 6*c*, following the sequencing process, which ends with all holders positioned on the first, moving carriage 112*a*, in delivery point sequence, the flats are transferred from first carriage 112*a* to packager 116. During this operational phase, as each holder 114 approaches its assigned packager (according to delivery sequence segment), the holder 114 will drop the flats via the latched mechanism. It should be recognized that some of the holders on the first carriage may be loaded at the feeders while, simultaneously or concurrently, some of the holders are (i) being moved from the first carriage to the stationary carriage and the flats are being removed from the holders from the first carriage at the unload point, all controlled by the sort computer.

Figure 7:
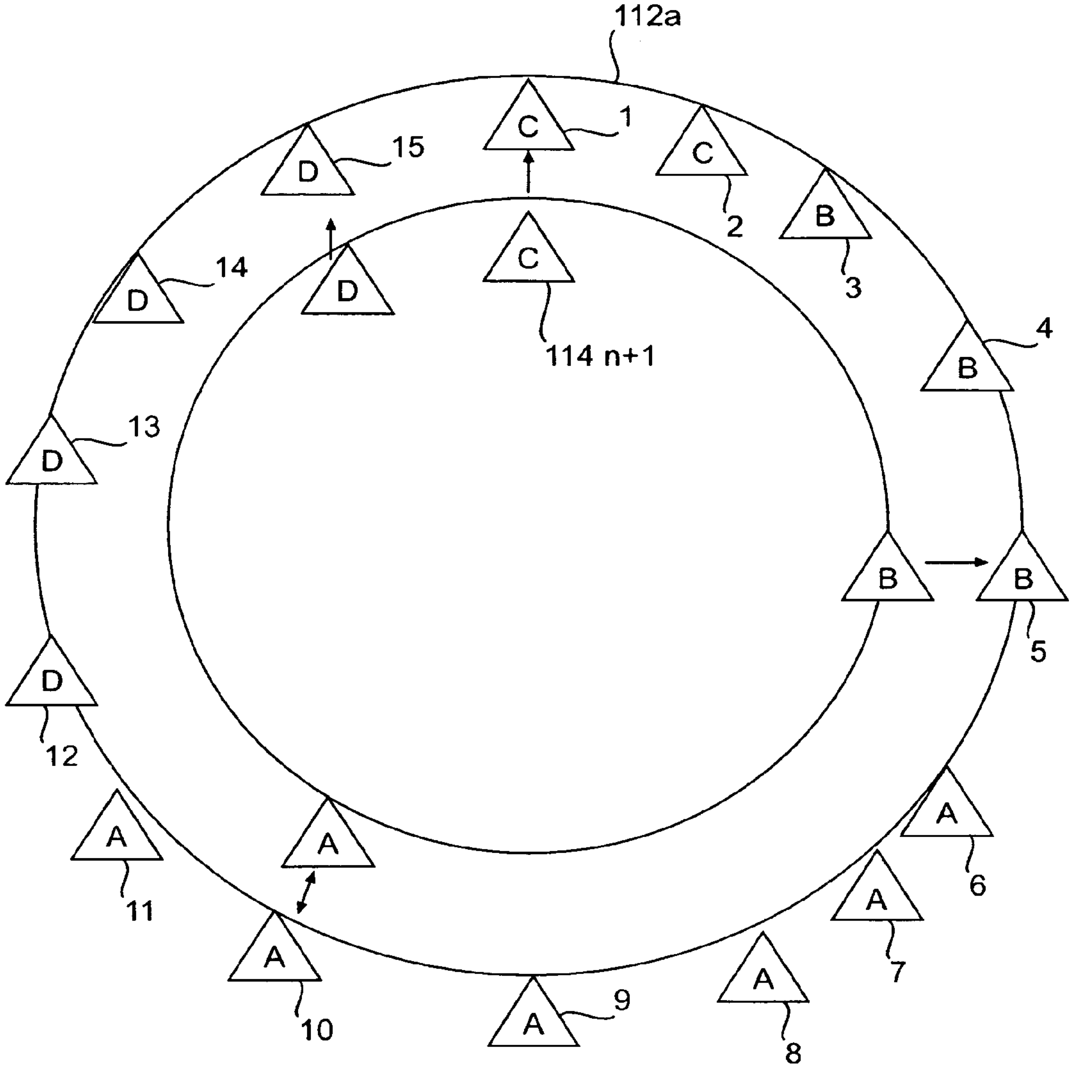
FIG. 7 shows a diagrammatic representation of the method of the invention.

FIG. 7 shows a diagrammatic representation of the above operational stages and is provided for illustrative purposes only. FIG. 7 shows the first and stationary carriages 112*a* and 112*b* with respective flats placed in holders $\mathbf{114}_{n+1}$. Initially, the holders $\mathbf{114}_{n+1}$ are positioned on the first carriage 112*a*, each being assigned a sequential number 1–15, for example. The sort computer 110 tracks the holders 1–15 and the flats (designated "A" through "D" based on delivery destination). Once all of the holders $\mathbf{114}_{n+1}$ are placed on the stationary carriage, the sort computer 110 determines whether any numbers assigned between the first and stationary carriage 112*a* and 112*b* are aligned. If so, then these holders are moved from the stationary carriage to the first carriage. In the example of FIG. 7, the $1^{st}$, $5^{th}$, $10^{th}$ and $15^{th}$ holders of the second carriage 112*b* are aligned by moving the first carriage 112*a* and then transporting the holders from the stationary carriage 112*b* to the first carriage 112*a*. The first carriage 112*a* is rotated, and the determination of alignment and movement is performed again until all of the holders are aligned and moved into sequence on the first carriage 112*a*.

While the invention has been described in terms of embodiments, those skilled in the art will recognize that the invention can be practiced with modifications and in the spirit and scope of the appended claims.

The invention claimed is:

1. A system for sorting objects, comprising:

at least one feeding station feeding non-sequenced objects to separate holders extending from a carriage movable in at least one direction; and a stationary carriage adjacent the moveable carriage;

wherein the separate holders transport the non-sequenced objects fed from the at least one feeding station back and forth between the moveable carriage and the stationary carriage to sort the non-sequenced objects stored in the separate holders into a sequence.

2. The system of claim 1, wherein the separate holders include a hinge and a releasable latch mechanism located at respective bottom corners.

3. The system of claim 2, further comprising an actuator for disconnecting the releasable latch mechanism at a predetermined time or location.

4. The system of claim 2, wherein the separate holders include a releaseable bottom.

5. The system of claim 1, further comprising:

a mechanism for attaching each of the separate holders to the moveable carriage and the stationary carriage; and a mechanism for transporting each of the separate holders between the moveable carriage and the stationary carriage via sliding or rolling.

6. The system of claim 5, further comprising a reading device and sort computer, the reading device reading information on the objects and delivering the information to the sort computer to assign sort codes to the separate holders and positions on the moveable carriage, the sort computer further instructing the movement of the moveable carriage, incrementally, and the mechanism for transporting the separate holders to the stationary carriage in the delivery sequence.

7. The system of claim I wherein the moveable carriage is movable in two directions for loading of the non-sequenced objects and unloading of the objects, in a sequence.

8. The system of claim 1, wherein the objects are mail pieces.

* * * * *